Patented Nov. 21, 1950

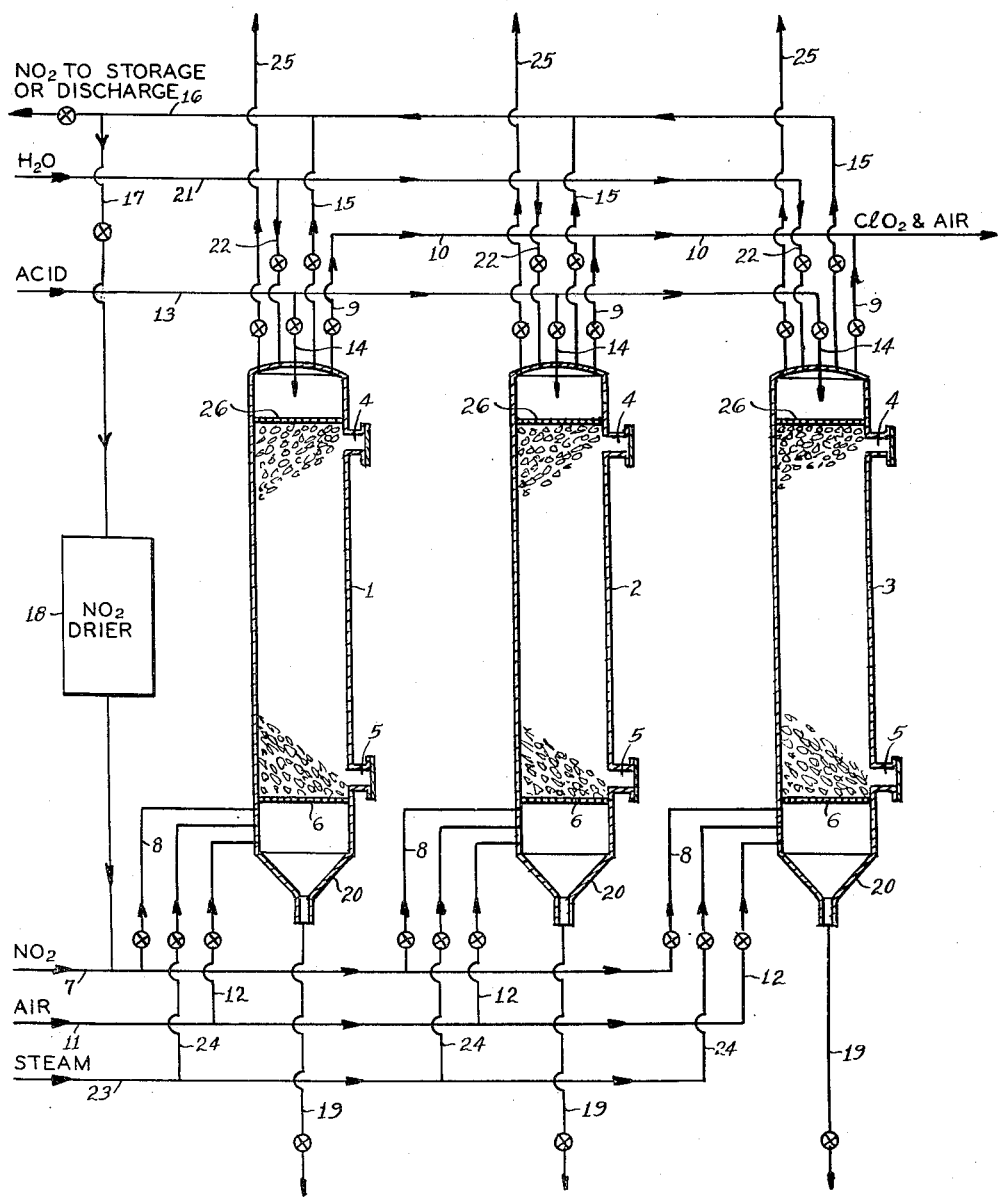

2,530,468

UNITED STATES PATENT OFFICE 2,530,468

PROCESS FOR GENERATION OF CHLORINE DIOXIDE

Willis S. Hutchinson, St. Paul, Minn., assignor to Mathieson Chemical Corporation, a corporation of Virginia Application October 21, 1947, Serial No. 781,157

6 Claims. (Cl. 23—152)

This invention relates to the generation of chlorine dioxide by reacting nitrogen peroxide with a chlorite.

In my copending application Ser. No. 544,646, filed July 12, 1944, now Patent No. 2,475,285, I have described and claimed a process for the generation of chlorine dioxide whereby nitrogen peroxide is caused to react with an alkali or alkaline earth metal chlorite, the nitrogen peroxide advantageously being mixed with an inert gas, air, for instance, prior to the contact with the chlorite, whereby chlorine dioxide, free from elemental chlorine and in safe concentrations, may be economically produced. My present invention constitutes an improvement in the process of my said copending application and provides an improved cyclic process whereby nitrogen peroxide is recovered from the residual salts and is repeatedly used for the generation of additional chlorine dioxide.

According to the process of my copending application, the nitrogen peroxide, diluted with air or other inert gas, as previously noted, is passed in contact with the chlorite, for instance, sodium chlorite, in flaked or granular form resulting in the reaction of the nitrogen peroxide with the chlorite to form chlorine dioxide gas and sodium nitrite. The nitrogen peroxide for use in the process is continuously supplied to the system, for instance, by passing air through a field of electrical discharge, for instance, through a generator of the Alsop or Brabender type. However, the nitrogen peroxide so produced is relatively expensive and materially adds to the cost of the chlorine dioxide generation.

In my present cyclic process, the nitrogen peroxide is substantially completely recovered from the nitrite and is reused in the process. Not more than a small amount of make-up nitrogen peroxide is required to be added to the system after the initial charge of nitrogen peroxide is introduced.

My improved process accordingly comprises a cyclic operation composed of a plurality of dependent, cooperating steps comprising the reacting of the nitrogen peroxide with the chlorite to form chlorine dioxide and the corresponding nitrite, the recovery of nitrogen peroxide from the nitrite and the reacting of the liberated nitrogen peroxide with further chlorite to generate additional chlorine dioxide.

The recovery of nitrogen peroxide from the nitrite is, with advantage, effected, in accordance with my present invention, by reacting an acid, advantageously a relatively non-volatile acid, sulfuric acid, for instance, with the nitrite constituting the residual salt from the chlorine dioxide generation step. The reaction of the acid with the nitrite results in the generation of nitrous gases composed of $NO_2$ and $NO$ in equal molar proportions. Simultaneously with, or subsequent to, the generation of the nitrous gases, air or other inexpensive source of oxygen, is admixed with the nitrous gases resulting in the conversion of the nitric oxide, $NO$, to $NO_2$. The resulting mixture of $NO_2$ and air is then returned to the chlorine dioxide generating step.

The chemical reactions involved in my cyclic process, when sodium chlorite and sulfuric acid, for instance, are used, appear to be as follows:

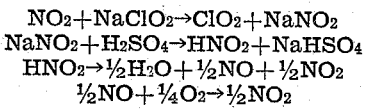

In converting a chlorite to chlorine dioxide it has usually been necessary to provide an oxidizing agent which serves to increase the valence of chlorine from 3 in the chlorite to 4 in the chlorine dioxide. So far as I am aware, it has not previously been possible to use atmospheric oxygen, or other cheap sources of gaseous oxygen, for this purpose. However, by the use of the nitrous gases as an intermediary, in accordance with my present process, I am enabled continuously to generate chlorine dioxide from the chlorite, once the process is in operation, with the addition of little or no oxidizing agent other than air, or other cheap sources of gaseous oxygen.

In place of sulfuric acid, other relatively nonvolatile acids which react with the nitrite to produce $NO_2$ may be used, for instance, syrupy phosphoric acid, or other somewhat more dilute phosphoric acid may be used. Also concentrated nitric acid, or somewhat more dilute nitric acid is usually sufficiently non-volatile for use in my process. The acid used should be relatively nonvolatile so as to avoid contamination of the resultant nitrous oxide gases with excessive acid vapors.

Particularly desirable results are obtained by the use of sulfuric acid because of its relative cheapness and its effectiveness. Sulfuric acid in concentrations as low as 50% is usually effective but generally it is more advantageous to use sulfuric acid of 85% concentration or higher, up to a concentration of say 98%.

Sodium chlorite is especially desirable and effective in my process because of its commercial availability and because the residual salts formed therefrom are highly soluble in water. However, the chlorites of other alkali and alkaline earth metals may be used, for instance, potassium chlorite and calcium chlorite.

As previously noted, it is usually desirable to generate the chlorine dioxide in relatively low concentrations in an inert gas, for instance, air, and this is effectively accomplished by diluting the $NO_2$ with air, prior to its reaction with the chlorite. However, other inert gases may be used for this purpose, for instance, nitrogen, argon, or mixtures of gases inert with respect to the nitrogen peroxide, the chlorite and the chlorine dioxide.

My cyclic process is, with advantage, carried out in apparatus comprising three separate chambers advantageously composed of vertically elongated towers or tubes, one chamber being used as the chlorine dioxide generator in the first step of my process, a second chamber being used for the recovery of the nitrogen peroxide from the nitrite, while a third chamber is being cleaned, dried and recharged with fresh chlorite.

It will be understood that my present invention is not restricted with respect to the type of apparatus in which the process is carried out. However, the process will be further described and illustrated with reference to the accompanying drawing which represents conventionally and somewhat diagrammatically, apparatus such as just described.

In the drawing, three substantially identical vertically elongated chambers are indicated by the reference numerals 1, 2 and 3, respectively, each provided near its upper end with an opening 4 through which the chamber may be charged with the chlorite, sodium chlorite, for instance, in granular or powdered form, and adapted to be closed during operation. A similar opening 5, also adapted to be closed during operation, is provided near the lower end of each chamber.

In operation, chamber 1, for instance, is filled with the solid chlorite, preferably mixed with an inert material adapted to facilitate the passage of gases therethrough, for example, porcelain Berl saddles, broken glass tubing, or the like, the charge being supported by the perforated support 6. In starting the operation, nitrogen peroxide diluted with any inert gas, air for instance, is passed to the system through manifold line 7 and, from thence, through valved connection 8 into the lower end of the generating chamber 1 and passes upwardly through the bed of chlorite in the chamber. The nitrogen peroxide reacts with the chlorite to generate chlorine dioxide which passes off from the upper end of the chamber through valved connection 9 and manifold 10, in safe concentration in the air, or other inert gas to the point of use, the air being premixed with the nitrogen peroxide or separately introduced into the chamber through manifold 11 and valved connection 12.

The generation of chlorine dioxide in chamber 1 is continued until the chlorite has been substantially completely converted to the nitrite. The passage of nitrogen peroxide to chamber 1 is then discontinued and instead is passed into the lower end of chamber 2, which has previously been charged with chlorite.

The valve in connections 8 and 9 having been closed, sulfuric acid, or other relatively strong, non-volatile acids, is then passed into the top of chamber 1 through manifold 13 and valved connection 14. Simultaneously therewith, air is passed into the lower end of the chamber through valved connection 12. The nitrite in the chamber reacts with the incoming acid generating nitrous acid and when sulfuric acid is used, a sulfate, or bisulfate is formed which may, or may not, dissolve completely in the strong acid. The relatively volatile nitrous acid decomposes spontaneously into nitric oxide and nitrogen peroxide, the former being oxidized to form additional nitrogen peroxide by the excess air being passed upwardly through the chamber. The resultant nitrogen peroxide in admixture with air passes from the upper end of the chamber through valved connection 15 and manifold 16 to storage or else through line 17 into manifold 7 and from thence through the valved connection 8 of the chamber then being used for chlorine dioxide generation. A nitrogen peroxide drier 18 of known type is, with advantage, interposed in line 17 for the removal of any moisture or entrained acid present in the gas.

The rate of addition of the acid is, with advantage, regulated in such a way as to generate nitrogen peroxide at a convenient rate for its direct introduction into the chlorine dioxide generating chamber or chambers then being used. However, when desirable it may be stored as gas, or dissolved in water to form nitric acid. The dilute acids resulting from the $NO_2$ recovery containing salts dissolved therein may be discharged from the chamber during the operation through valved line 19 leading from the lower end of the conical hopper 20 constituting the lower end of the respective reaction chambers.

When the generation of nitrogen peroxide from the nitrite has been completed, the flow of acid and air to the chamber is discontinued by closing the valves in the respective lines, the valved connection 15 is closed and water is admitted to the top of the tower through manifold 21 and valved connection 22 to flush out any remaining salts or acids. Thereafter, steam is admitted to the lower end of the tower through manifold 23 and valved connection 24 to steam out the tower and the tower is then dried by blowing air therethrough the manifold 11 and connection 12, the steam and air being drawn from the upper end of the tower through valved connection 25. After the chambers have been washed, steamed and dried, following the $NO_2$ recovery operation, the saddles, or other gas distributing devices, are removed from the chamber through the openings 5 and may be admixed with fresh chlorite for recharging the chamber.

While the nitrogen peroxide is being recovered from the nitrite in chamber 1, chamber 2 may be used for the generation of chlorine dioxide. Finally, chamber 3 will be used for the generation of chlorine dioxide, while the nitrogen peroxide is being recovered from the nitrite in chamber 2 and chamber 1 is being cleaned, dried and recharged. Thus, the operation may be carried on continuously without interruption.

The several reaction chambers and the connections thereto are identical and like elements thereof are indicated by like reference numerals on the drawing. Each tower is provided at its upper end with a perforated partition 26 adapted to promote the separation of suspended solids and liquids from the effluent gases.

It will be appreciated that in the generating and handling of chlorine dioxide, the concentration of the chlorine dioxide should generally be less than that at which its partial pressure reaches 70 millimeters of mercury. Usually the partial pressure of chlorine dioxide should not exceed about 30 millimeters of mercury for safe handling. In accordance with my present invention, the concentration of chlorine dioxide may, as previously noted herein, be regulated by diluting the nitrogen peroxide passed through the chlorine dioxide generator with air or other gases, inert with respect to the nitrogen peroxide, the chlorite and the chlorine dioxide. This may be effected by premixing the required amount of air with the nitrogen peroxide prior to passing it to the chlorine dioxide generator or a suitable amount of air may separately be passed into the lower end of the chlorine dioxide generator concurrently with the passage of nitrogen peroxide thereto. The amount of air premixed with the nitrogen peroxide is, with advantage, regulated by regulating the amount of excess air passed upwardly through the chamber during the nitrogen peroxide liberating step of the process. Where desired, additional air may subsequently be mixed with the nitrogen peroxide.

It will be appreciated that substantial amounts of nitrogen peroxide need be supplied to the system only during the initial stage of operation and may be discontinued as soon as the step of recovering the $NO_2$ from the nitrite is begun. Thereafter, all or substantially all of the $NO_2$ requirement is recovered from the nitrite in my cyclic process.

I claim:

1. In the process for the generation of chlorine dioxide by reacting nitrogen peroxide with a chlorite of a metal of the class consisting of the alkali and alkaline earth metals resulting in the formation of the corresponding nitrite, the steps of reacting a relatively non-volatile acid with the nitrite whereby a gas mixture of $NO_2$ and $NO$ is evolved, oxidizing the $NO$ of the mixture to $NO_2$ by admixing excess air therewith and reacting the $NO_2$ with further chlorite to generate additional chlorine dioxide.

2. A cyclic process for the generation of chlorine dioxide which comprises reacting $NO_2$ in dilution with air with a chlorite of a metal of the class consisting of the alkali and alkaline earth metals by passing the $NO_2$ in contact with the chlorite whereby chlorine dioxide and a nitrite of the corresponding metal are formed, reacting the nitrite with a relatively non-volatile acid and thereby liberating nitrogen peroxide and recycling the liberated nitrogen peroxide in contact with the chlorite to generate additional chlorine dioxide.

3. A cyclic process for the generation of chlorine dioxide which comprises passing nitrogen peroxide in contact with a chlorite of a metal of the class consisting of the alkali and alkaline earth metals, whereby chlorine dioxide is generated with the concurrent formation of the corresponding nitrite, reacting a relatively non-volatile acid with the nitrite and thereby liberating a mixture of $NO$ and $NO_2$, oxidizing the $NO$ of the mixture to $NO_2$ by mixing excess air therewith and recycling the resultant $NO_2$ diluted with the air in contact with additional chlorite to generate further chlorine dioxide.

4. In the process for the generation of chlorine dioxide by reacting nitrogen peroxide with a chlorite of a metal of the class consisting of the alkali and alkaline earth metals resulting in the formation of the corresponding nitrite, the steps of reacting sulfuric acid with the nitrite whereby a gas mixture of $NO_2$ and $NO$ is evolved, oxidizing the $NO$ of the mixture to $NO_2$ by admixing excess air therewith and reacting the $NO_2$ with further chlorite to generate additional chlorine dioxide.

5. A cyclic process for the generation of chlorine dioxide which comprises reacting $NO_2$ in dilution with air with a chlorite of a metal of the class consisting of the alkali and alkaline earth metals by passing the $NO_2$ in contact with the chlorite whereby chlorine dioxide and a nitrite of the corresponding metal are formed, reacting the nitrite with sulfuric acid and thereby liberating nitrogen peroxide and recycling the liberated nitrogen peroxide in contact with the chlorite to generate additional chlorine dioxide.

6. A cyclic process for the generation of chlorine dioxide which comprises passing nitrogen peroxide in contact with a chlorite of a metal of the class consisting of the alkali and alkaline earth metals, whereby chlorine dioxide is generated with the concurrent formation of the corresponding nitrite, reacting sulfuric acid with the nitrite and thereby liberating a mixture of $NO$ and $NO_2$, oxidizing the $NO$ of the mixture to $NO_2$ by mixing excess air therewith and recycling the resultant $NO_2$ diluted with the air in contact with additional chlorite to generate further chlorine dioxide.

WILLIS S. HUTCHINSON.

REFERENCES CITED

The following references are of record in the file of this patent:

Mellor, Inorganic and Theoretical Chemistry, vol. 8, pp. 419, 429, 1928, Ed. Longmans, Green and Co., N. Y., publishers.